3,097,177
Patented July 9, 1963

3,097,177
LIGNOCELLULOSE MOLDING COMPOSITIONS
Ralph Waldo Emerson, Jackson, Miss., assignor to Emerite Corporation, Jackson, Miss., a corporation of Delaware
No Drawing. Filed Mar. 10, 1958, Ser. No. 720,016
4 Claims. (Cl. 260—17.3)

This invention relates to moded chemical hard boards formed by simultaneously reacting a lignocellulosic material together with furfural, urea, and lignin in the presence of an acid. The invention includes compositions of matter useful for producing the chemical hard boards as well as the process for producing the chemical hard boards.

In my prior Patent No. 2,764,569, issued September 25, 1956, I have described a chemical hard board and a process of producing the same by the simultaneous reaction of a lignocellulosic material with furfural and urea. The present invention is an improvement on the chemical hard board and compositions as described and claimed in my prior patent.

The invention in its broader aspects comprises the formation of hard boards or other molded objects by simultaneously reacting a lignocellulosic material with furfural, urea, and lignin under acidic conditions while in a confined state with the application of low temperatures and low pressures.

The incorporation of the lignin into the compositions of this invention results in the production of a chemical board having substantially improved properties over the products described in my prior patent. With the incorporation of as little as 4 percent by weight lignin based on the weight of the dry lignocellulosic matter, the boards produced possess approximately a 30 percent increase in pull and breaking strength. The modulus of rupture (MOR) is also significantly increased. The hard boards further possess improved internal bonds as well as improved surface properties for adhesion, printing, and painting. The incorporation of the lignin also increases the water resistance and generally produces a better overall chemical hard board at low pressures and temperatures, as well as permitting the use of less urea and furfural.

Various lignocellulosic materials can be used to form the compositions and molded chemical boards of this invention including wood in various comminuted forms such as sawdust, shavings, saw kerf, trim ends, and so forth. Other comminuted vegetable fibers such as corn stocks, bagasse, mechanical pulp, shredded newspaper, cotton stocks, and so forth can also be used. The lignocellulosic materials can be used in various comminuted forms but I have found that it is advantageous to employ fibrous lignocellulosic materials in the form of fairly small fibers or aggregates of fibers. The lignocellulosic materials can be reduced to a small fibrous nature by running them through an attrition mill. If the lignocellulosic material is composed of fairly large particles, it is advantageous to first run the lignocellulosic material through a hammer mill to reduce the size of the larger particles before they are fiberized in an attrition mill. In rendering the lignocellulosic material fibrous in an attrition mill, it is generally treated to bring the moisture content up to about 50 percent by weight by treating it with steam or soaking it in water. After the lignocellulosic material has been run through the attrition mill it is dried to reduce the moisture content to the desired level as hereinafter discussed.

Different acids can be used to produce the molded products or chemical hard board according to this invention including inorganic acids such as nitric acid, sulfuric acid, phosphoric acid, hydrochloric (muriatic) acid, and so forth; inorganic salts which produce an acid reaction in water such as cupric sulfate, ferrous sulfate, sodium acid sulfate, primary calcium phosphate, primary sodium phosphate, aluminum chloride, and so forth; and organic acids such as carbolic acid, oxalic acid, acetic acid, resorcinol, and so forth.

The amount of acid required to promote the reaction between the lignocellulosic material, urea, furfural, and the lignin can be varied quite widely depending upon the particular acid or acid salt employed, the particular lignocellulosic material being reacted, the properties desired in the end product such as water resistance, color, flexibility, and so forth, the density of the chemical board being produced, and so forth. In view of the numerous variables, it is not possible to set forth the minimum or maximum amount of acid which can be used. Sufficient acid should be used however to promote the reaction between the lignocelulosic material, furfural, acid, and the lignin to produce a board with acceptable properties. This minimum amount of acid will vary depending upon the other conditions and properties of the reaction mixture as described below. What may be the necessary minimum for one composition may or may not be the necessary minimum for another composition. I have employed as low as .2 percent by weight acid based on the weight of the dry lignocellulosic material and have produced a chemical board having acceptable properties. The same is true with respect to maximum acid. Generally, as the amount of acid is increased the board becomes more brittle and hard. If the amount of acid employed is too large the acid will tend to destroy the lignocellulosic fibers and weaken the resulting product. I have produced chemical boards according to this invention by using as high as 16 percent by weight acid based on the weight of the dry lignocellulosic material. At this concentration with most acids, the boards generally show some signs of disintegration of the lignocellulosic fibres and are fairly brittle and weak. The minimum and maximum amounts of acid, in addition to the most advantageous amounts, can readily be determined by those skilled in the art by routine experimentation taking into account the teachings with respect thereto in the instant specification.

Lignocellulosic materials can vary quite substantially in their composition and texture. Finer lignocellulosic materials will require less acid. Different types of lignocellulosic materials such as wood, bagasse, corn stock, and cotton stock vary somewhat in composition and will also require different amounts of acid. Bagasse for example generally requires less acid than wood. The compositions of the various woods are also different and it may be advantageous to employ different amounts of acid with different woods. If fir is used as the lignocellulosic material I have found that very low amounts of acid can be used, on the order of .2 percent by weight. Oak wood will generally require more acid. The necessity for the use of different amounts of acid with different woods and lignocellulosic materials is probably due to the variable acid content already contained in the wood or lignocellulosic material at the onset.

The end properties of the chemical board can also be varied advantageously by varying the amount and type of acid used. The color of the resulting board can be changed by using different concentrations of acid. Water absorption is generally decreased with an increase in the acid concentration and vice versa. An increase in the acid concentration also increases the brittleness of the resulting board.

The amount of acid will also vary depending upon the desired density of the chemical board. It is advantageous to use more acid in the production of low density board, between about 35 and 50 pounds per cubic foot, and less acid in the production of a higher density board.

I have found that it is advantageous to use muriatic acid of a commercial grade. Muriatic acid is commercially available in different concentrations but muriatic acid of between 18 and 20 Baumé is quite suitable. Muriatic acid is easier to work with and does not effect a reaction between the components of the composition until sufficient heat and pressure are supplied. In addition when the reaction does occur after the application of heat and pressure it is easier to control and is not as violent as when other inorganic acids are employed such as sulfuric acid and nitric acid. Increased water resistance is also obtained by using muriatic acid especially over acid salts.

Urea is an essential constituent in the production of the chemical boards according to this invention. Other amines or amides cannot be substituted in whole for the urea but can be used in the formation of the chemical boards together with the urea to modify some of the characteristics of the finished products. Examples of other amines or amides which can be employed in the compositions or used as partial substitutes for the urea include hexamethylenetetramine, aniline, acetamide, thiourea, and the like. If other amines or amides are to be used as a partial substitute for urea there is a practical limit to the amount of such partial substitution since urea is a necessary constituent. The other amines or amides do not react sufficiently with the lignocellulose or with the furfural or lignin employed in the compositions. Some of the other amines or amides will decompose upon application of heat and form ammonia instead of reacting with the furfural, lignocellulose, and lignin. The formation of ammonia, if in sufficient quantities, can produce an alkaline condition throughout the composition and will stop or prevent the simultaneous reaction involving the urea, furfural, lignocellulose, and lignin which proceeds only under acid conditions. The amount of substitution of urea with other amines or amides which would be practical will vary depending upon a number of factors including the amounts of the necessray constituents used, the temperature employed, the particular amine or amide added or substituted, and so forth. The practical amount of substitution can readily be determined by routine experimentation by those skilled in the art.

Furfural is also a necessary constituent in the compositions and chemical hard boards of this invention. Furfural penetrates the lignocellulose very rapidly and also reacts very rapidly with the urea, the lignocellulose, and the lignin at elevated temperatures to produce a molded product with or without the use of pressure in a matter of seconds. Other aldehydes can also be employed in the compositions in addition to furfural to form the chemical boards or substituted in part for the furfural. Some examples of other aldehydes which can be used include butyraldehyde, formaldehyde, and the like. The use of other aldehydes can at times be advantageously employed to vary the characteristics of the final product. There is also a practical limit to the extent of furfural sbstitution. If too much of the other aldehydes are employed and too little furfural, the quality and strength of the final chemical hard board will be significantly diminished. The exact amount of aldehyde which can be employed or substituted for the furfural can readily be determined by routine experimentation by those skilled in the art.

Various lignin liquors or dry lignins can be used according to this invention so long as they are capable of inter-reacting with the urea, furfural and lignocellulose when heated according to this invention and do not adversely affect or interfere with the simultaneous reactions. The lignins commercially available today are generally obtained as by-products of processes for producing cellulose or other primary products such as paper and various forms of lignins are commercially available. The lignins can vary in their properties depending upon the particular process employed as well as the particular lignocellulosic material being treated. The woods used in the acid sulfite process, for example, are quite variable and may be composed of a mixture of coniferous and deciduous woods. Various bases may also be employed in the pulping process to give lignins having various properties. I have found that it is advantageous to use sulfite lignins such as those marketed by the International Paper Company under the name Binderine and by the Robeson Process Corporation under the trade name Goulac. A sulfite lignin manufactured by the West Virginia Pulp & Paper Company under the trade name Indulin can also be used.

The waste liquors from the sulfate and soda pulp processes can also be used but are not as advantageous as the sulfite lignins. The waste lignin liquors from the sulfate and soda pulp processes are generally known as alkali lignins and generally have a high pH on the order of 11.5. Since the reaction of this invention proceeds only under acid conditions it may be necessary to considerably reduce the pH of the alkali lignins before they can be used. The various types of lignins which can be used can readily be determined by those skilled in the art by routine experimentation and will mainly depend upon the particular properties desired in the finished chemical board. For a further discussion of lignins and lignin liquors, reference may be had to the "Encyclopedia of Chemical Technology," Kirk-Othmer (1952), volume 8. I have also found that lignins containing sugars are most advantageous. Most unrefined lignins contain about 15 to 20 percent sugar but the sugar content can be varied both above and below 15 and 20 percent and still maintain the advantages they impart to the finished product.

The lignin can be mixed into the lignocellulosic material together with the furfural and urea in various manners. Generally I prefer to add the lignin in the form of an aqueous solution containing about 50 percent solids.

The proportions of the various reactants, namely, lignocellulose, urea, furfural, and lignin can be varied quite widely and will depend largely upon the end product desired and it is therefore not possible to define the maximum and minimum limits very accurately. The percent deviations in the proportions of the necessary reactants will be dependent upon many variable factors such as the addition of other amines or amides, aldehydes, and fillers, the particular acid employed, the time, pressure, and temperature used in effecting the reaction, and so forth.

I have successfully used as little as 0.4 percent by weight furfural based on the dry weight of the lignocellulosic material used and formed a chemical board having excellent properties. I have similarly been able to use as little as 0.4 percent by weight urea based on the dry weight of the lignocellulosic material used and form chemical hard boards having excellent properties. I have also successfully used as high as 11 percent by weight urea and as high as 16 percent by weight furfural, but high percentages of both urea and furfural are to be avoided due to the increased costs involved.

The proportion of furfural to urea can be varied but in most instances I have found it to be advantageous to use the furfural and urea together in approximately equal parts by weight, especially when using muriatic acid to catalyze the reaction. Different proportions of urea and furfural can at times be advantageously employed depending upon the acid used and the type of product desired. With nitric acid, for example, I have found that it is advantageous to use less urea than furfural.

The amount of lignin which can be employed in the formation of the chemical hard boards according to this invention can be varied over a considerable range. Even a very small amount of lignin results in a chemical board of increased strength. As the amount of lignin is gradually increased the strength and properties of the board are simultaneously improved. The use of very small amounts of lignin in excess of 0 percent, 0.5 percent, for example, results in boards of improved strength. I have found that it is advantageous to use approximately 4 percent by weight lignin based on the dry weight of the lignocellulosic material. At this concentration the resulting chemical board possesses approximately a 30 percent increase in strength over a chemical board produced without the lignin. As the percentage of lignin is increased beyond 4 percent, the board continues to increase in strength but at a lesser rate and the additional strength gained by using the lignin much in excess of 4 percent by weight does not seem to justify the use of additional lignin. I have made hard boards having excellent properties using approximately 10 percent by weight lignin although larger amounts of lignin can be used if desired.

The above figures with respect to the proportions of the lignin which can be employed in the production of the boards were based on the use of a lignin liquor resulting from the sulfite pulp process from mixed woods and marketed by the International Paper Company under the trade name Binderine. Since the various lignins or lignin liquors obtainable as waste products of the paper pulp processes will themselves vary in composition it will be obvious to those skilled in the art that the use of other lignins may necessitate a variation in the proportions used in order to achieve optimum results. The amount of lignin will also vary depending upon the proportions of the other necessary reactants employed as well as other materials not entering into the reaction and the properties desired in the final product.

The invention also includes a tempering composition and a tempered chemical board. The tempering composition broadly comprises a suitable resinuous material together with a drying oil. Various types of resins can be used so long as they are capable of being formed into a solid, and preferably one which can be formed into a solid by oxidation polymerization, when incorporated into the chemical hard boards of this invention and will perform the desired tempering function. I have found that it is advantageous to employ petroleum residues from petroleum refining.

Some examples of petroleum resins which I have found to be particularly advantageous include a petroleum resin marketed by the Enjay Company, Inc. under the trade name CTLA, and a petroleum resin marketed under the trade name Panarez by the Pan American Refining Company. CTLA is formed during the fractionation of hydrocarbons and aromatics when olefins are treated to where they polymerize. CTLA is characterized by a low tensile strength. Panarez is a hydrocarbon resin derived from petroleum having a wide softening point range up to 300° F. and is readily soluble in aliphatic and aromatic hydrocarbons.

The tempering compositions can be advantageously incorporated into the moldable compositions before the reaction takes place to form the chemical hard board. In this manner the tempering composition can be uniformly distributed throughout the board. The incorporation of the tempering material into the composition prior to the formation of the hard board does not require any more tempering material than if it were applied by the dip method after the board had been formed and also results in a more uniformly tempered and better board.

Tempering of the chemical boards of this invention as herein disclosed adds additional strength to the finished products as well as greater water resistance, dimensional stability, surface properties, machine ability, and so forth. The use of the drying oil imparts flexibility to the hard board, reducing the brittleness and giving the board better nailability.

The tempering of the chemical boards also flashes out the residual acid incorporated therein. The tempering of the boards should thus be accomplished in circulating air to remove the flashed-out acid to prevent any tendency of the board to burn out during the tempering operation.

Various oxidizing agents can be used to reduce the set-up time of the tempering composition such as cobalt napthalate, iron noxthalate, boron trifluoride, boron trifluoride complexes and the like as will be apparent to those skilled in the art. I have found cobalt and iron napthalate to be particularly advantageous.

The tempering composition can be incorporated into the moldable compositions in varying proportions depending mainly upon the physical properties desired in the finished product. The amount of tempering composition will also necessarily vary depending upon the particular tempering composition employed. Generally, the tempering composition can be used advantageously between about 1 and 10 percent by weight based on the weight of the dry lignocellulosic material although both lower and higher percentages can be used if desired. Generally, I have found that good results can generally be obtained by using approximately 4 percent by weight of the tempering composition.

Different drying oils can be used in conjunction with the other components of the tempering composition to impart flexibility thereto and to also impart to the board improved nailability. Examples of drying oils which can be used include tung oil, tung bottoms, linseed oil, linseed oil pitch, and so forth. The drying oil can be used in varying proportions as will be appreciated by those skilled in the art. I have found that it is advantageous to use a petroleum resin drying oil ratio of between about 4:1 to 3:1 although both higher and lower ratios can be used.

I have also found that it is advantageous to incorporate a wax in the tempering composition. The incorporation of the wax increases the dimensional stability of the resulting board. Various waxes can be used such as paraffin wax as will be understood by those skilled in the art. I prefer to incorporate between ½ to 1 percent by weight wax although both higher and lower amounts can be used depending upon the final properties desired in the product. Concentrations of wax in excess of about 3 percent by weight, however, tend to weaken the board.

The amount of oxidizing catalyst can be varied. About 1 to 2 percent by weight of catalyst based on the weight of the petroleum resin has been generally found to be quite satisfactory.

The proportions of the various constituents of the tempering composition as well as the proportion of the total tempering composition to the moldable composition containing the lignocellulosic material, urea, furfural, and lignin can be varied quite widely depending upon the end properties desired in the product as well as the particular petroleum resin, drying oil, drying oil wax, and catalyst used to make up the tempering composition.

The tempering conditions can also be varied considerably. I have found that a tempering temperature of about 325° F. for a period of about 4 hours is quite satisfactory although higher and lower temperatures can be used. Generally, as the temperature is lowered longer tempering times should be employed. The tempering temperature should be at least sufficient to set up the tempering composition and should not be so high as to adversely affect or injure the chemical board.

The various constituents of the moldable compositions of this invention can be mixed in different manners. I have found that the mixing is facilitated if the urea is first dissolved in about equal parts of water and thoroughly dispersed throughout the lignocellulosic material together with the furfural and lignin. I have also found that the lignin can be better dispersed throughout the mix if it is introduced thereto in an aqueous form containing about 50 percent solids. I prefer to add the acid to the mixture of lignocellulosic material, urea and furfural just prior to the molding or reaction step. The stability of the mixture without the acid present is very good. After the acid has been added, the stability of the resulting composition which is ready for molding will vary depending upon the acid used. I have found, for example, that when employing an 18 Baumé muriatic acid, the stability of the resulting mixture after the acid has been added is approximately 2 hours. If acid salts are employed, the stability of the mixture is considerably increased. The tempering composition can be added at any time, either before or after the acid, and thoroughly mixed therein.

The molding compositions containing the lignocellulosic material, the chemical reactants, and the tempering materials if employed, can be advantageously molded containing about 8.5 percent by weight of moisture. Both a lower and higher moisture content can of course be used, but I have found that a moisture content of approximately 8.5 percent by weight is most advantageous. Much higher moisture concentration requires more complicated molding techniques and longer molding times while a lower moisture content renders the moldable composition more difficult to work with and the resulting reaction product is not quite so uniform.

In order to achieve the desired moisture content of the molding composition prior to molding and heating it, the moisture content of the lignocellulosic material can be controlled before mixing it with the chemical reactants or tempering compositions. The moisture content of the wood can thus be varied depending upon the moisture contained in the chemical reactants or tempering composition mixed therewith. As pointed out herein it is advantageous to disperse urea in water in order to facilitate mixture thereof throughout the other components of the molding composition and also desirable to insert the lignin in an aqueous environment having approximately 50 percent solids. As the amount of liquid added to the lignocellulosic material is decreased, the moisture content of the lignocellulosic material can be correspondingly increased. As the water content of the chemical reactants and tempering composition is increased, the water content of the lignocellulosic material should be correspondingly decreased if the desired moisture content in the final moldable composition is to be obtained. I have found that it is advantageous to dry the lignocellulosic material to between about 4 and 6 percent by weight and add to the mixture sufficient water with the urea and lignin to bring the moisture content of the resulting moldable composition up to approximately 8.5 percent by weight.

High pressures are not required to mold the compositions of this invention into the particular shape desired or to produce strongly bonded, smooth surfaced articles. Such low pressures can be used since the chemical reaction between the lignocellulosic material, the urea, the furfural, and the lignin produces bonds that hold the mass in the desired shape. All that is required is to hold the molding compositions in a desired shape for a sufficient time to permit the reaction to be completed to the extent that the newly formed chemical boards will maintain their shape. High pressures can of course be employed if desired to reduce the volume of a given mass and give a denser product. Chemical boards having fairly heigh densities can be produced, however, with the use of very low pressures. I have produced chemical boards having densities between 35 pounds per cubic foot to about 87 pounds per cubic foot according to this invention. It is also advantageous to employ higher pressures when the lignocellulosic material is being used in a very finely divided form such as wood flour and fines.

The reaction time and temperature of the moldable compositions of this invention can be varied quite widely. The time of reaction and confinement in the press may vary from a very few seconds to several minutes depending upon the temperature used and the thickness and type of moldable composition being formed. The temperature should be maintained sufficiently low to prevent charring of the reactants. I have found it to be advantageous to use reaction temperatures of about 380° F. In some instances I have advantageously employed temperatures of about 500° F. The temperature should be at least sufficient to effect the reaction within a reasonable time. The reaction time and temperature will also depend somewhat on the pressure used. Using a pressure of about 1200 p.s.i.g. at 450° F., I have found that chemical boards of a thickness of about 1/8 inch can generally be produced by lowering the platens against the moldable composition without stops and immediately thereafter removing the board. In the production of a board of about 1/4 inch in thickness under the same conditions I have found that it is advantageous to maintain the board in the heated press for about 3 minutes.

Inert fillers not containing lignin or lignocellulosic materials such as sand, expanded mica, asbestos, or relatively pure cellulosic materials such as cotton linters, can be added to the moldable compositions of this invention and embedded in the chemical boards. Such materials will give weight, body, feel, and various surface finishes and other characteristics to the chemical boards according to their own properties but they do not enter into the reaction. Such fillers cannot be used to replace the lignocellulosic material or lignin component without departing entirely from this invention since no useful product can be obtained when this is attempted.

The present invention permits the utilization of lignocellulosic materials such as wood waste and bagasse and also the lignin liquor wastes from pulping processes in a rapid, efficient manner with very low percentages of furfural, urea, and acid compared to that of the wood wastes or lignin liquor wastes. The chemical board produced according to this invention can be molded or pressed into various shaped articles such as wall board, table tops, and other articles of furniture and construction, as well as other articles of variable sizes and shapes. The chemical boards of this invention are thermosetting and can be cut, sawed, sanded, drilled, nailed, screwed, or otherwise shaped, worked, or treated like wood. The hardness, water absorption, density, surface characteristics, and strength of the product can be varied over a wide range as desired by varying the reactants, temperature, pressure, and the time the pressure and temperature have been maintained.

*Example 1*

A lignocellulosic material was prepared from a mixture of different types of southern hard woods include gum wood, poplar, oak, and so forth in the form of sawdust, shavings, saw kerf, trim ends, and so forth. Some of the wood was green while other portions of the mixture consisted of kiln-dried wood. The wood mixture was then run through a hammer mill to reduce the size of the trim ends and other larger particles of wood in the mixture. The moisture content of the wood mixture after it had been removed from the hammer mill was brought up to about 50 percent by treating the wood mixture with steam. The wood mixture containing 50 percent moisture was then run through an attrition mill to reduce the wood particles, including the sawdust, to a fibrous material. The wood mixture was then dried to a moisture content of about 6 percent.

0.8 pound of furfural together with 0.8 pound of commercial grade urea having a nitrogen content between 46 and 47 percent, marketed by W. R. Grace Chemical Company, dissolved in 0.8 pound of water, 8.0 pounds of waste lignin liquor from a sulfite pulp process, marketed by the International Paper Company under the trade name Binderine, and 3.2 pounds of 18 Baumé muriatic acid were thoroughly dispersed throughout 106 pounds of the fiberized wood mixture containing about 6 percent moisture as prepared above.

68 pounds of the mixture of the wood, urea, furfural, lignin, and acid were laid onto an aluminum caul in the form of a 3 x 5 sheet and transferred into a press having metal platens which had been previously heated to a temperature of 380° F. The platens were supplied with stops to prevent the platens from closing beyond 13/16 inch. The heated platens were then brought together to the stops at a pressure of about 400 p.s.i.g. for 3½ minutes. After 3½ minutes the pressure on the platens was released to about 125 p.s.i.g. and held for about 13 minutes to allow the heat to penetrate through the center of the board. The molding composition placed in the press contained about 11.5 percent moisture.

The reacted board was then removed from the press. The resulting chemical board had a density of about 50 pounds per cubic foot, a thickness of about 0.76 inch, and an MOR of about 1650 p.s.i.

*Example II*

*Mix A.*—A mixture was then prepared by thoroughly dispersing 0.8 pound of furfural together with 0.8 pound of a commercial grade urea having a nitrogen content between 46 and 47 percent, marketed by W. R. Grace Chemical Company, dissolved in 0.8 pound of water, and 8.0 pounds of a waste lignin liquor from a sulfite pulp process, marketed by the International Paper Company under the trade name Binderine.

*Mix B.*—An oil tempering mixture was then prepared by thoroughly mixing 4 pounds of an oxidizable petroleum residue, marketed by Enjay Company, Inc. under the trade name CTLA together with 1⅓ pounds of low-grade beta tung oil and 2 percent by weight of iron naphthalate containing 6 percent iron based on the weight of the CTLA and ½ pound of crude scale paraffin wax.

2 pounds of 18 Baumé acid were then thoroughly dispersed throughout 106 pounds of the wood mixture containing about 6 percent moisture as prepared in Example I. Mix A was then thoroughly dispersed through the wood acid mixture followed by the thorough dispersion of Mix B.

68 pounds of the above mixture were laid onto an aluminum caul in the form of a 3 x 5 sheet and transferred into a press having metal platens which had been previously heated to a temperature of 380° F. The platens were supplied with stops to prevent the platens from closing beyond 13/16 inch. The heated platens were then brought together to the stops at a pressure of about 400 p.s.i.g. for 3½ minutes. After 3½ minutes, the pressure on the platens was let off to about 125 p.s.i.g. and held for about 13½ minutes to allow the heat to penetrate through the center of the board. The molding composition placed in the press contained about 11.5 percent moisture.

The reacted board was then removed from the press and placed in a tempering oven at 330° F. for 4 hours. The resulting tempered board had a density of 50 pounds per cubic foot, a thickness of about 0.76 inch, an MOR of 2400 p.s.i., a screw holding of 475 pounds on the face, and a water absorption of 16 percent after being completely immersed in water at 70° F. for 24 hours.

Another chemical board was produced in the same manner as in Example II with the exception that the water content was reduced to about 8.5 percent by weight prior to reacting the composition in the press. The reduction of the moisture content reduced the reaction time to about 14 minutes and it was not necessary to maintain the board in the press for a longer period of time in order to allow the heat to penetrate to the center of the board. The reacted board after tempering had substantially the same properties as the reacted and tempered board in Example II.

*Example III*

*Mix A.*—A mixture was prepared by thoroughly dispersing 0.4 pound of furfural together with 0.4 pound of a commercial grade urea having a nitrogen content between 46 and 47 percent, marketed by W. R. Grace Chemical Co., dissolved in 0.4 pound of water and 4.0 pounds of a waste lignin liquor from a sulfite pulp process marketed by the International Paper Company under the trade name Binderine.

*Mix B.*—An oil tempering mixture was then prepared by thoroughly mixing 2 pounds of an oxidizable petroleum resin, marketed by the Enjay Company under the trade name CTLA, together with ⅔ pound of low-grade beta tung oil and 2 percent by weight of iron naphthalate containing 6 percent iron based on the weight of the CTLA and ¼ pound of crude scale paraffin wax.

1 pound of 18 Baumé muriatic acid was then thoroughly dispersed throughout 53 pounds of the wood mixture containing about 6 percent moisture as prepared in Example 1. Mix A was then thoroughly dispersed through the wood acid mixture followed by the thorough dispersion of Mix B.

68 pounds of the above mixture were laid onto an aluminum caul in the form of a 3 x 5 sheet and transferred into a press having metal platens which had been previously heated to a temperature of 380° F. The platens were supplied with stops to prevent the platens from closing beyond 13/16 inch. The heated platens were then brought together to the stops at a pressure of about 400 p.s.i.g. for 3½ minutes. After 3½ minutes, the pressure on the platens was let off to about 125 p.s.i.g. and held for about 13 minutes to allow the heat to penetrate through the center of the board.

The reacted board was then removed from the press and placed in a tempering oven at 330° F. for 4 hours. The resulting tempered board had similar properties to the board produced in Example II and possessed an MOR of about 25 percent less than the board in Example II and a water absorption increase of between 10 and 15 percent.

I claim:

1. A composition of matter capable of being molded into objects comprising a mixture of a major part of a lignocellulose material, together with about 0.4–11% by weight of urea, about 0.4–16% by weight of furfural, about 0.5–10% by weight of lignin, under acidic conditions, said proportions being based on the weight of the dry lignocellulosic material in which a tempering composition comprising a petroleum residue resin, a drying oil, and an oxidizing catalyst is also incorporated into the mixture.

2. The composition of claim 1 in which a wax is also incorporated into the mixture.

3. The method of producing a chemical board which comprises simultaneously reacting a mixture of a major part of a lignocellulose material together with about 0.4–11% by weight of urea, about 0.4–16% by weight of furfural, and about 0.5–10% by weight of lignin, under acidic conditions, said proportions being based on the weight of the dry lignocellulosic material and in which a tempering composition comprising a petroleum residue resin, a drying oil, and an oxidizing catalyst is incorporated in the mixture during reaction.

4. The method of claim 3 in which the mixture also contains a wax.

References Cited in the file of this patent

UNITED STATES PATENTS

| | | |
|---|---|---|
| 2,335,097 | Aken | Nov. 23, 1943 |
| 2,669,522 | Othmer et al. | Feb. 16, 1954 |
| 2,750,298 | Kiebler et al. | June 12, 1956 |
| 2,764,569 | Emerson | Sept. 25, 1956 |
| 2,765,287 | Aycock | Oct. 2, 1956 |

UNITED STATES PATENT OFFICE
CERTIFICATE OF CORRECTION

July 9, 1963

Patent No. 3,097,177

Ralph Waldo Emerson

It is hereby certified that error appears in the above numbered patent requiring correction and that the said Letters Patent should read as corrected below.

Column 1, line 9, for "moded" read -- molded --; column 2, line 15, for "lignocelulosic" read -- lignocellulosic --; column 3, line 37, for "necessray" read -- necessary --; line 56, for "sbstitution" read -- substitution --; column 7, line 53, for "heigh" read -- high --; column 9, line 26, before "acid" insert -- muriatic --; line 68, for "Chemical Co." read -- Chemical Company --.

Signed and sealed this 14th day of January 1964.

(SEAL)
Attest:
ERNEST W. SWIDER

Attesting Officer

EDWIN L. REYNOLDS

Acting Commissioner of Patents